United States Patent [19]

Yang

[11] 4,181,190
[45] Jan. 1, 1980

[54] MOTORCYCLE AND BICYCLE SAFETY CONTROLS

[76] Inventor: Yin-Lung Yang, P.O. Box 865, Kaohsiung, Taiwan 800, China

[21] Appl. No.: 614,862

[22] Filed: Sep. 19, 1975

Related U.S. Application Data

[63] Continuation of Ser. No. 458,411, Apr. 10, 1974, abandoned.

[51] Int. Cl.² .............................................. B62H 1/00
[52] U.S. Cl. ..................................... 180/219; 280/293
[58] Field of Search ................ 280/293, 303; 180/30, 180/33 R

[56] References Cited

U.S. PATENT DOCUMENTS

| | | | |
|---|---|---|---|
| 1,152,821 | 9/1915 | Kurtz | 180/30 |
| 1,254,624 | 1/1918 | Betts et al. | 280/299 |
| 1,730,282 | 10/1929 | McClure et al. | 180/33 R |
| 1,796,339 | 3/1931 | Nicholson | 180/30 X |
| 2,141,568 | 12/1938 | Tingle | 280/293 |
| 3,700,059 | 10/1972 | Sutton | 280/293 |

*Primary Examiner*—Kenneth H. Betts

[57] ABSTRACT

A safety control that can be used on all tandem wheel vehicles, except that throttle and engine ignition controls are additions to the structure of the safety control for motor driven vehicles. The driver can operate the following mechanisms: horn (motorcycle only), throttle (motorcycle only), wheel brakes, controllable legs, engine ignition switch (motorcycle only), locking devices in a predetermined sequence for up-holding the vehicle by applying only a single operation of the hand grip or foot pedal or both of them to prevent the vehicle from tilting over in an emergency or in an ordinary stop or parking or at a very slow speed of the vehicle. The driver does not necessarily use his feet to touch the ground to remain erect, nor to get off from the vehicle to stow up said legs by foot power, thereby allowing safety and ease in using a tandem wheel vehicle.

9 Claims, 28 Drawing Figures

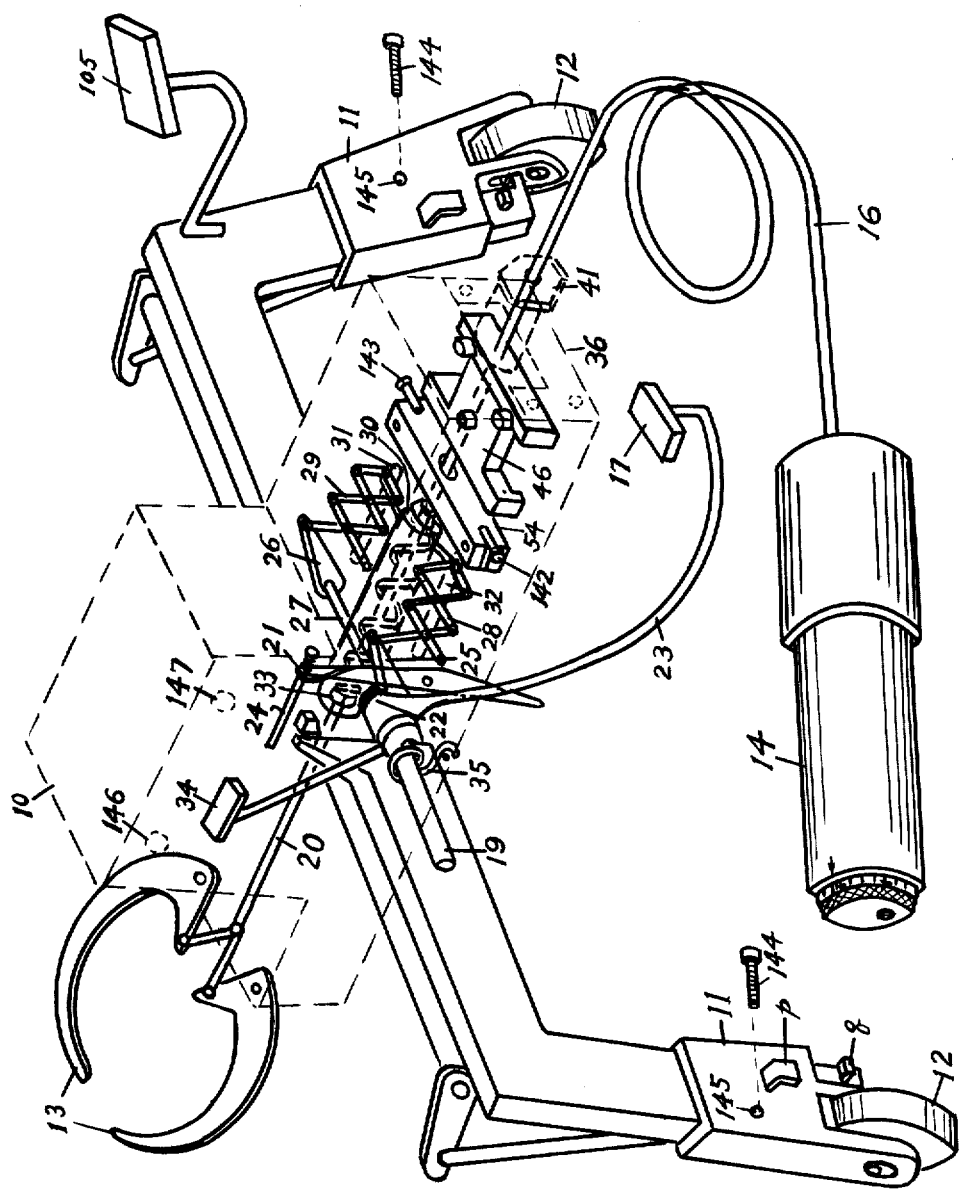
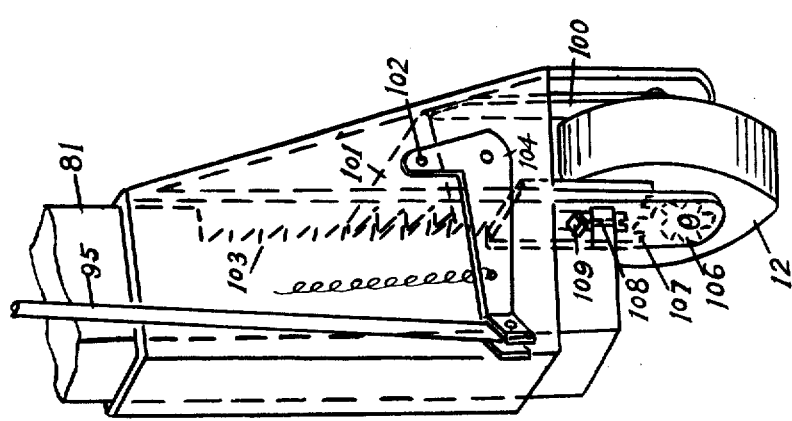

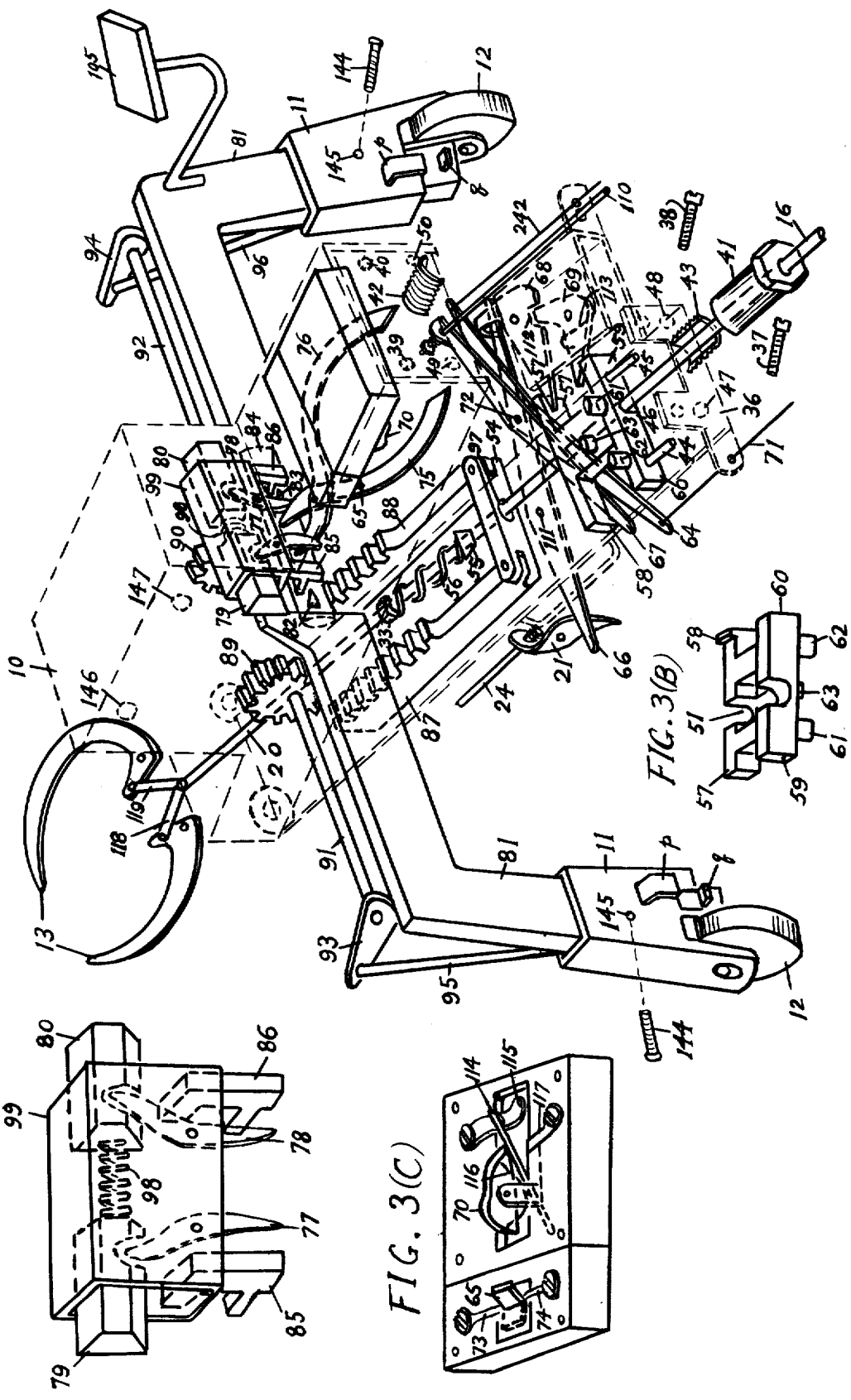

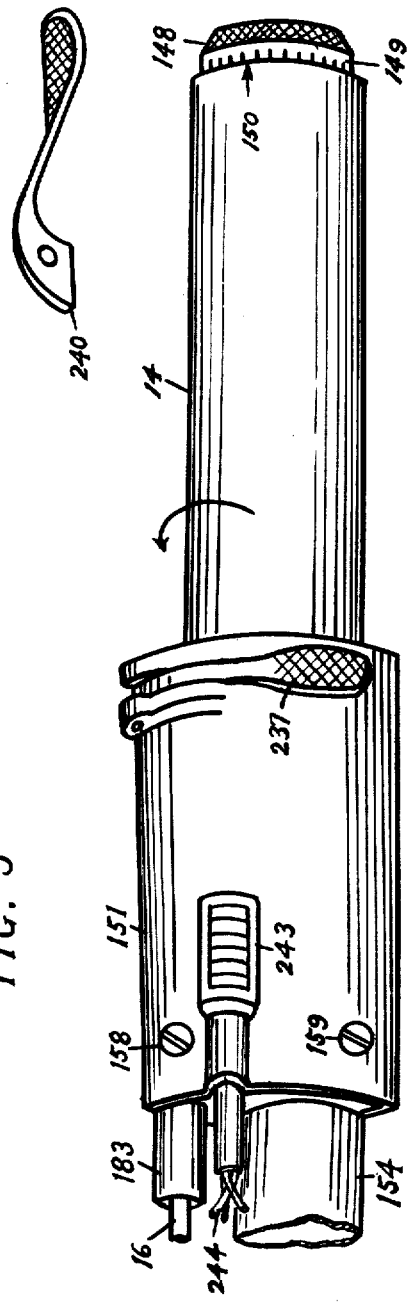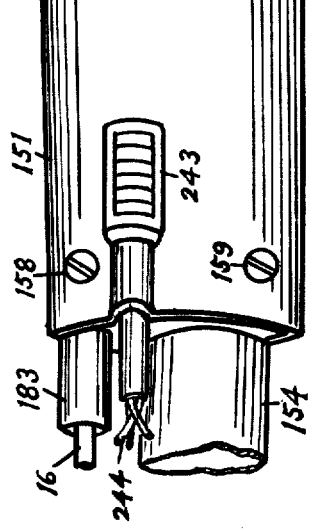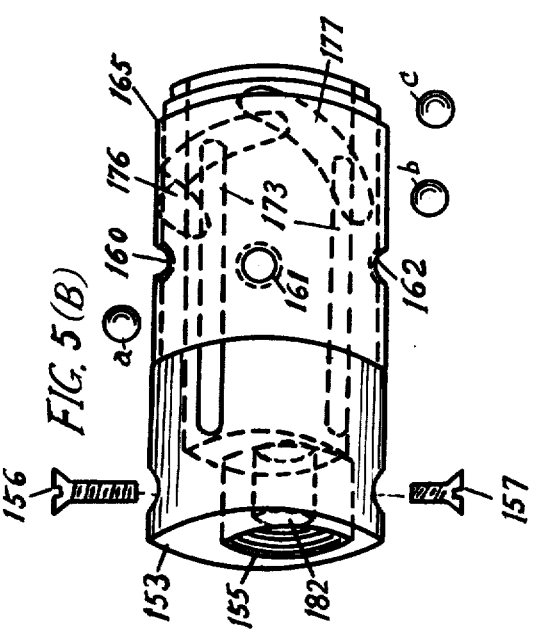

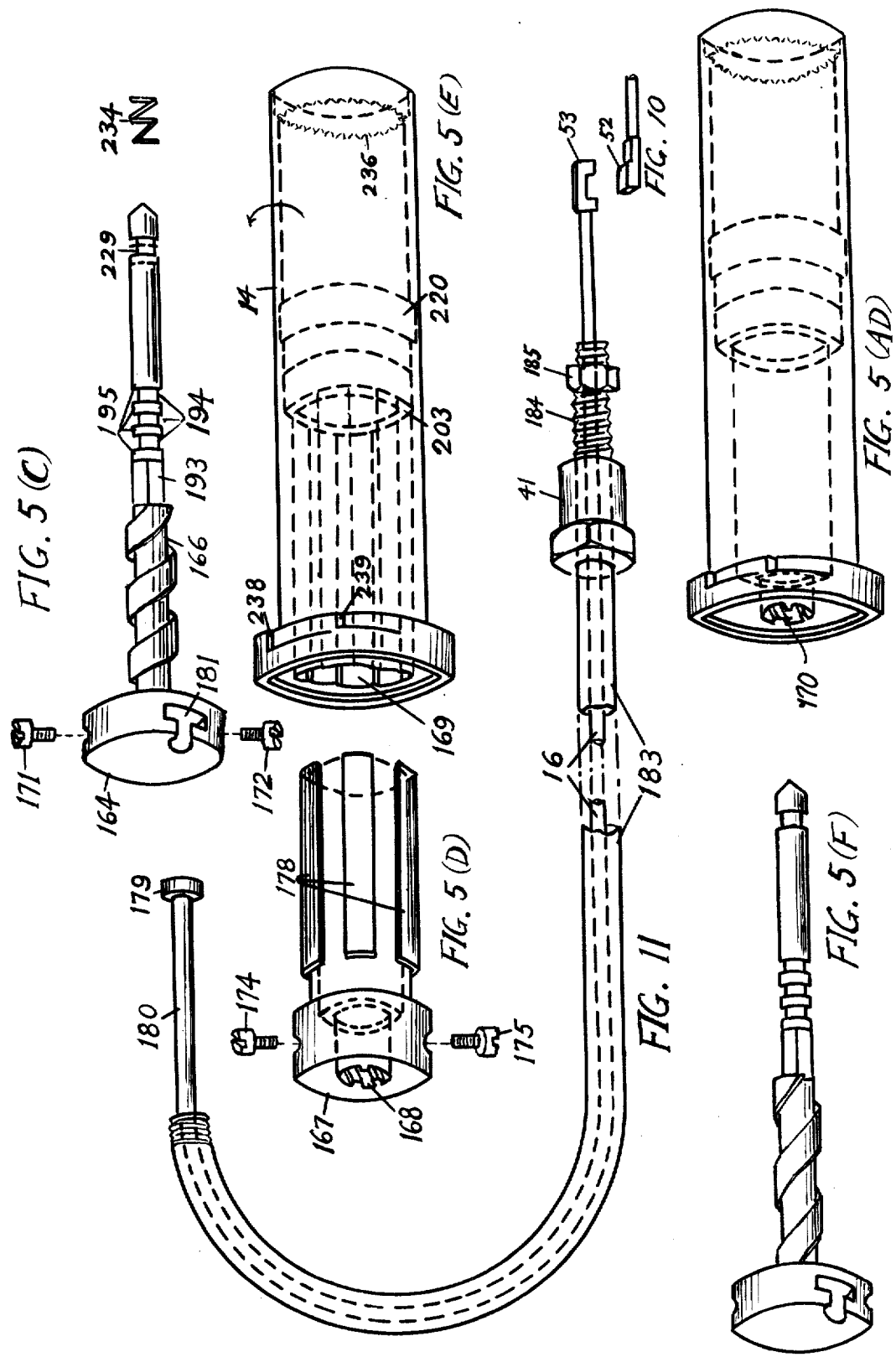

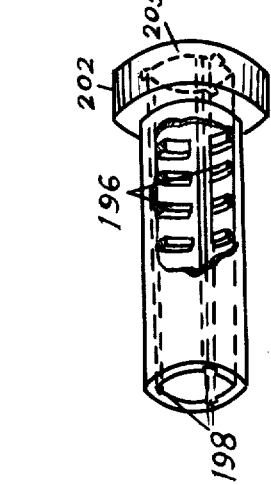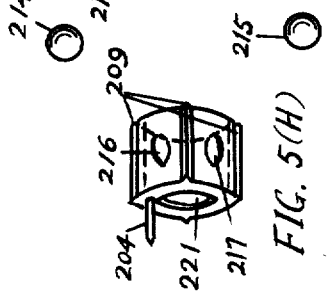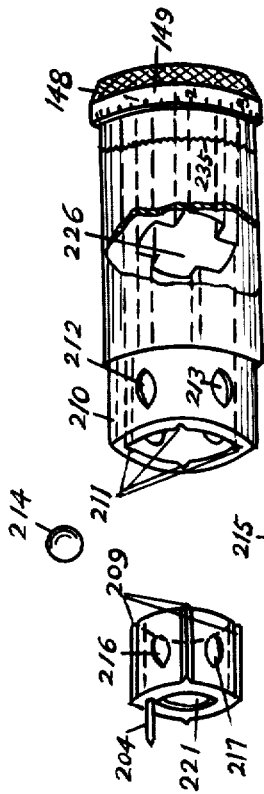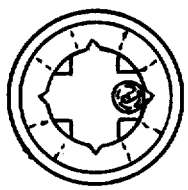

MOTORCYCLE AND BICYCLE SAFETY CONTROLS

This application is a continuation of my application Ser. No. 458,411 filed Apr. 10, 1974, now abandoned.

Firstly; the object of this invention is to provide a safety control for a tandem wheel vehicle. The driver can operate many mechanisms in a certain sequence by applying only a single operation of the hand grip or the foot pedal or both simultaneously and the driver makes no change in his control habits of conventional motocycle or bicycle controls, giving a smooth, orderly, and safe operation as desired.

Secondly; by providing two controllable legs which can automatically be lowered and extended for upholding the vehicle and prevent it from tilting over in an emergency, or at a very slow speed of said vehicle, and or in a regular stop, thefriver does not have to get off from the vehicle or use his legs for propping himself to the ground for balancing; hence more safety is achieved.

Thirdly; by providing controllable legs which can uphold the vehicle for parking, users do not have to put up the legs by foot or lift a heavy loaded vehicle, thus giving a smooth and easy parking without scratching their shoes or divoting the ground.

Fourthly; this invention provides controllable legs which can be extended to different lengths (each leg irrespective of the other) to the surface of the ground, making a four-point support together with the wheels, therefore allowing a balanced and sturdy park on a rough or inclined surface.

Fifthly; this invention provides a suitable means for automatically locking or quick releasing of the brakes after said brakes are applied when the legs are lowered and extended in an emergency. The brakes will not release accidentally even if the driver's hand or foot becomes injured and leaves the brake controls.

Sixthly; this invention provides controllable legs which can be further extended from the normal as a support in case of a flat tire, thus aiding in moving or towing by the rollers at the end of the legs, without damaging the flat tire.

Seventhly; this invention provides a "built-in" lock into the hand grip. It can be locked either by a key-operated device which is pushed into the plug of the hand grip, or can be locked by a permutation-operated device which turns the plug of the hand grip in either direction, or can be locked by both of said devices. Means are provided for varying either one or both of the devices by the owner of the vehicle without adding or removing any piece of the parts. Moreover hooks which are provided at the legs can automatically lock each other to a ring or bolt which is permanently fixed on the ground Eighthly; this invention provides a roller at the end of each leg, said rollers can roll with the wheels when the legs are normally lowered and extended. Means are also provided for the said rollers to keep them stationary or fixed to prevent them from slipping in case of necessity.

Thus, it will be seen that there has been provided in this invention a construction by which the various objects noted above, together with many practical uses are achieved, and yet may be manufctured at an approximately the same cost of the original mechanisms and controls as on the conventionl motorcycle or bicycle.

Other objects and advantages will become apparent from the following description taken in connection with the accompanying drawing. Similar reference characters refer to similar parts throughout the several views of the drawings. In which:

FIG. 2 is an elevation and perspective view of the safety control with partially mechanisms omitted for simple illustration. Parts of the linkages are shrunken for better illustration.

FIG. 3 is an elevation and perspective view of the safety control showing the internal construction of the mechanism box with the bottom cover disconnected and both the hand grip and foot pedal operational devices are omitted for simple illustration.

FIG. 3(A) is an elevtion and perspective back side view in detail of type A controllable legs on a larger scale.

FIG. 3(B) is a perspective view of the control block on a larger scale.

FIG. 3(C) is an elevation bottom view in detail of a horn switch and engine ignition switch (motorcycle only) with the cover removed on a larger scale.

FIG. 3(D) is an elevation and perspective view of the type A controllable legs retaining pins in a larger scale.

FIG. 3(E) is an elevation side view of the retaining arm.

FIG. 5 is an elevation side view of the hand grip embodying operational device and control locking devices.

FIG. 5(A) is an elevation and perspective side view of the retaining cylinder.

FIG. 5(B) is an elevation and perspective side view of the mounting cylinder.

FIG. 5(C) and 5(F) are the elevation side views of the control piston and the piston rod with different threads thereon.

FIG. 5(D) is an elevation side view of the control cylinder.

FIG. 5(E) is an elevation and perspective side view of the hand grip.

FIG. 5(AD) is an elevation side view of another type of the hand grip.

FIG. 5(G) is an elevation and perspective side view of the locking cylinder of the permutation-operated device.

FIG. 5(H) is an elevation and perspective side view of the drum.

FIG. 5(I) is an elevation and perspective side view of the plug of the hand grip where the key-operated device will be mounted.

FIG. 5(J) are the exploded elevation side views of the permutation discs and washers removed from the locking cylinder of FIG. 5(G).

FIG. 5(K) are the exploded elevation side views of ward plates, hook and locking plate of the key-operated device removed from the plug of the hand grip of FIG. 5(I).

FIG. 6 is a top view of the shape of the washer and the permutation discs.

FIG. 7 are the top views of the shape of said locking plate, hook and ward plates.

FIG. 8 is a view of the key.

FIG. 9 is the left end view of the plug.

FIG. 10 is an elevation side view of end contour of the control rod.

FIG. 11 is the elevation side view of the flexible shaft and its retaining tube with adjustable nut.

The description herein of this invention is more concerned in the construction of a safety control used on motorcycles. It is not necessary to repeat the construction of a safety control used on other tandem wheel vehicles, because the mechanisms and controls on other tandem wheel vehicles such as legs, brakes, horn, and locking devices, are almost the same as on the motorcycle, except that there is the lack of throttle and engine ignition controls.

Figure 1:
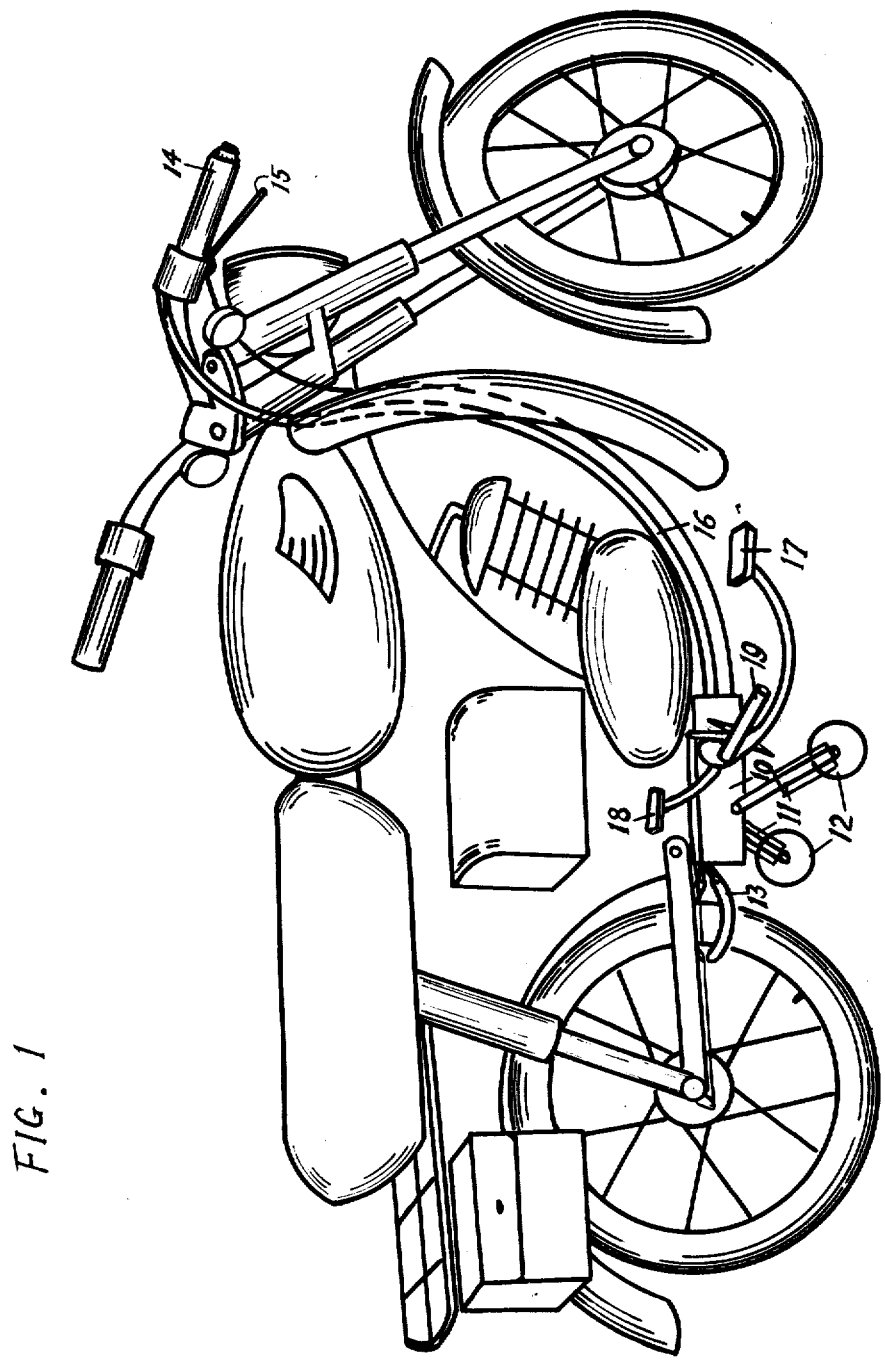
FIG. 1 is a vertical side view of the location of a safety control mounted on a motorcycle (or on other tandem wheel vehicles) embodying the features of the invention.

FIG. 1 shows the location of safety control mounted on a motorcycle according to this invention (same location on other tandem wheel vehicles). It comprises of a mechanism box 10 in which numerous mechanisms are installed, a pair of controllable legs 11 with a roller 12 at each end of the legs, a wheel lock 13, an operational hand grip 14 embodying an operational device and control locking devices, an auxilary throttle control 15 (motorcycles only), a flexible shaft 16, a pair of foot pedals 17 and 18, and a foot rest 19. Said flexible shaft 16 which connects the hand grip 14 and a control rod 20 in the mechanism box 10 for transmitting the operation of the same, will be later described in detail.

FIG. 2 is showing the constructional relationship between foot pedal 17, hand grip 14, and the control rod 20. Some mechanisms in the mechanism box 10 as shown in FIG. 3 are herein omitted for simple illustration. Said control rod 20 can be moved back and forth longitudinally by either or both the foot pedal 17 or the hand grip 14. It is obvious that aft wheel brake control lever 21 will be first actuated or released by a cam action of cambered end 22 of the pedal rod 23 when said pedal 17 is slightly applied on or off. This makes the aft wheel brake applied or released through a lingage 24. Upon further application of pedal 17 said cambered end 22 of the pedal rod will hold said brake on and actuate two control arms 25 and 26 concurrently (25, 26 are fixed on the same shaft 27), hence operating two extendable and retractable linkages 28 and 29, and then operating a pipe 30 through slots 31, 32 at both side walls of the mechanism box 10. As a result, said control rod 20 can be moved forward by said pipe 30, because of the force transmitted to the shoulder of a ring 33 which is fixed on the control rod 20. Furthermore, when said control rod 20 is moved by said operation of pedal 17, the hand grip 14 will be rotated at the same time by the action of flexible shaft 16 and by the operational device in the hand grip 14 which will be described in detail below. Contrarily, when said control rod 20 is moved by the operational device of hand grip 14 it will have no effect on said mechanisms 25, 26, 28, 29, 30, nor effect said pedal 17 because of the open end of the pipe 30 as shown. Thus making the aft wheel brake independent of other opertional devices. Referring to FIG. 2, a pedal 34 and a spring 35 are used for restoring said pedal 17 and its controls. On the bicycle, the above mentioned aft wheel brake control and the pipe operating linkage 24, 28, 29 may be connected to a left hand operational means or to a reverse operational mechanism of the pedals of the bicycle.

The internal construction of mechanism box 10 of the safety control is shown in FIG 3 with bottom cover 36 of said box partially opened, and both the hand grip and foot pedal operational mechanisms as shown in FIG. 2 are omitted here for simple illustration. It is seen that some mechanisms are installed on said cover, they are disengaged from their cooperative mechanisms which are located at upper and inside of said box 10 when said cover is opened or disconnected. Hence said mechanisms can operate normally only when said cover is properly closed and connected with said box. After the connection, said cover can be fastened with screws 37, 38 to holes 39 and 40 at the end of said box 10, and can be secured by an adjusting nut 41, said not also serves as a cap for two halves of the boss 42, 43 which are formed integrally with the cover and the box respectively. Moreover, a pair of retaining pins 44, 45 on a control block 46 will stick through holes 47, 48, 49, 50, as a locking device when said block 46 is carried to a locked position by the control rod 20 to prevent said cover from being opened by unauthorized persons when the control locking device in the hand grip is locked. Said control block 46 serves as a quick disconnect coupling for said control rod 20 and said flexible shaft 16 besides its normal control purpose which will be later described. As shown in FIG. 3(B) there is a groove 51 at the bottom of said control block for coupling both ends of said control rod 20 and said flexible shaft 16 (as shown 52 and 53 in FIGS. 10 and 11) when they are properly installed, and will be quick disconnected when said control block is removed.

As above mentioned the control rod 20 can be moved back and forth longitudnally by either the hand grip or foot pedal, said rod (for example moving forward) will first carry control block 46 forward as soon as said rod moves, and then a control lever 54 will also be moved by a tapered sliding collar 55, spring 56, and the said ring 33 which is fixed on the control rod 20, thus, fingers 57, 58, 59, 60 and protrusions 61, 62, 63 which are formed integrally with said control block together with control lever 54 will operate throttle control 64 (motorcycles only), horn switch 65 (motorcycles only), controllable legs 11, wheel brake controls 66 and 67, aft wheel lock 13, wheel brakes locking device 68, 69, and engine ignition switch 70 (motorcycles only) in a predetermined sequence dependent upon how much the pedal 17 and/or hand grip 14 is operated.

Figure 4:
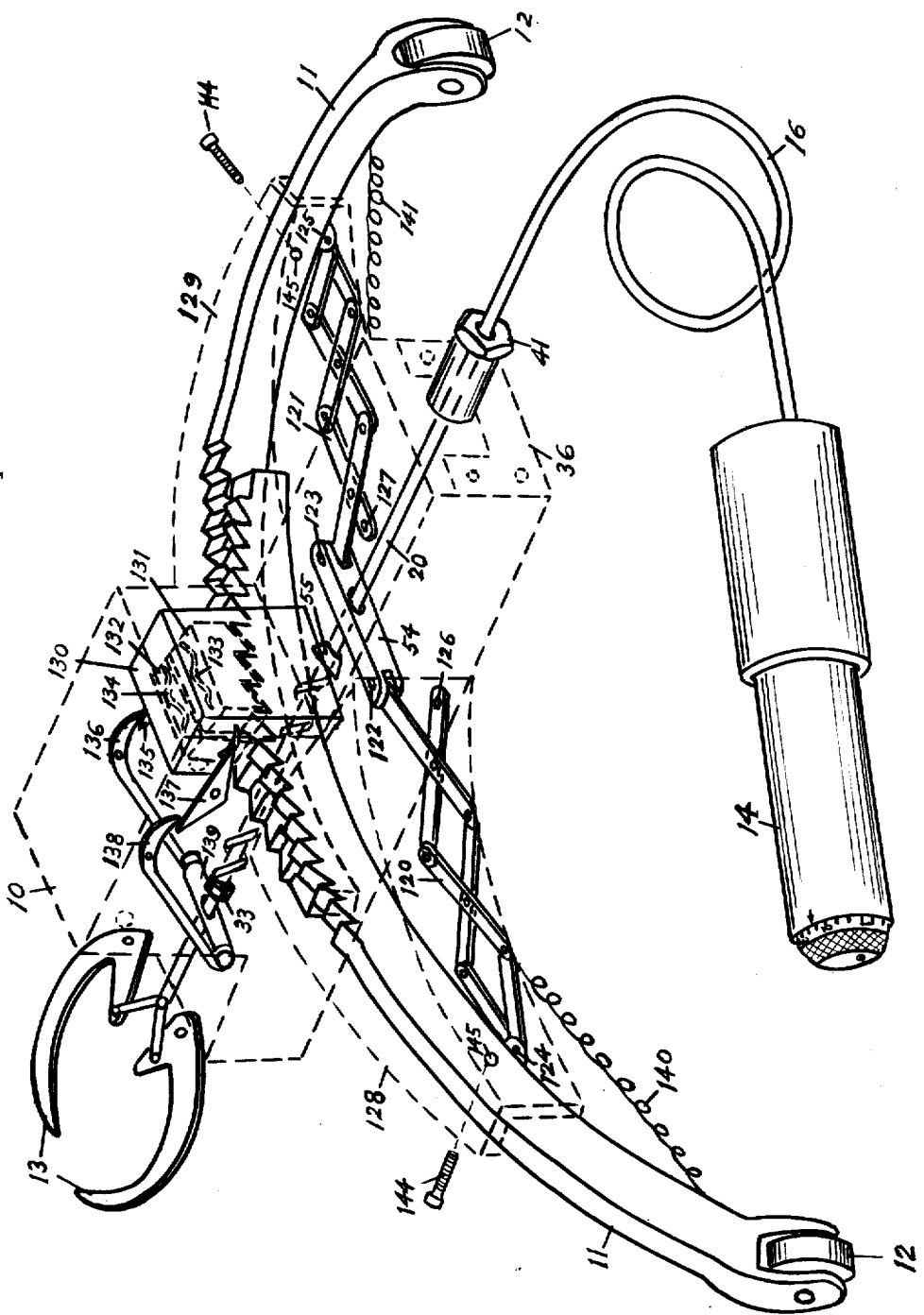
FIG. 4 is an elevation and perspective view of the safety control employing type B controllable legs, with partial mechanisms and foot pedal operational device omitted for simple illustration.

Because of the position or distance between said fingers and protrusions as well as the ring 33, spring 56, and all said controls or mechanisms are definitely designed and arranged. However, the sequence or order of the operations could be varied be changing the position or distance of said mechanisms if so desired in design. Said operational sequence according to the invention will be described in connection with their structure in detail as follows: First, when control block 46 is moved forward together with control rod 20, the finger 60 of said control block will relax throttle control cable 71 (motorcycles only) and its control lever 64 which is pivoted on 72, so decreasing the throttle (motorcycles only). Second, as said block keeps moving forward, the protrusion 63 will strike and flip the horn switch 65 (motorcycles only) on and connect the horn circuit 73 and 74 for a few seconds, as shown in FIG. 3(C), said switch will return to its original position automatically by its own spring tension and open the horn circuit as soon as said protrusion 65 passed over. Third, as said control block together with said control rod continues moving further forward, the controllable legs 11 will be lowered and extended by the function of control lever 54 which is moved by a tapered sliding collar 55, spring 56 and the ring 33 as above noted. However, according to this invention said controllable legs are classified into two different types, here in FIG. 3 is classified as type A, and in FIG. 4 is classified as type B which will be later described. Referring to FIG. 3, protrustions 61, 62 on the control block 46 will force the scissors arms 75, 76 to actuate levers 77, 78 and retract retaining pins 79, 80 of type A controllable legs as shown in FIG. 3 and FIG. 3(D), thus said controllable legs 11 together with its frame 81 will be lowered by its own weight and the moment of inertia, or by the tension of a spring which is not shown. As a result, two keys 82 and 83 which are formed integrally with the same shaft 84 of said frame 81 will raise the control lever retaining arms 85 and 86 releasing the control lever 54 as soon as said frame is lowered to a vertical position, allowing said cntrol lever 54 to pull gear strips 87 and 88 forward and rotate gears 89 and 90, in turn, rotate extension rods 91, 92 and arms 93, 94, hence extending the legs 11 by connecting rod 95, 96 along the posts of the frame 81. Since control lever 54 is pivoted at its elliptic center hole 97 against the tapered sliding collar 55 on the control rod 20, said control lever will tilt to either side because of its pivotal mobility relative to the control rod, allowing the legs 11 extended differently in length when the ground surface is rough or inclined, thus said legs will touch the ground concurrently with the wheels of the motorcycle, rendering a four-point stationary support. As soon as the controllable legs and the frame are lowered to a vertical position, the retaining pins 79, 80 as already described will be extended by the tension of spring 98 in a box 99, thus retaining said legs and said frame in the vertical position unless said pins are retracted by said scissors arms 75, 76 again in the reverse operation of the controls. A roller 12 is mounted at each end of the legs for rolling purposes during the slow movement of the vehicle or in a sudden brake application. As soon as the legs are extended and touch the ground, the reaction force of the ground acts on said rollers and causing slightly upward movement of said rollers because of the elliptic axle bearing thereon, then said reaction force is transmitted to a push rod 100 as shown in FIG. 3(A) and push a ratchet arm 101 about its pivot 102 to meet against the ratchet surface 103 at the post of the frame 81, hence retaining the legs and holding it secure by the weight of the motorcycle on said rollers. Said ratchet arm 101 will disengage the ratchet surface 103 of said frame for retraction of the legs 11 by the connecting rod 95 and elbow 104 as soon as said retaining pins 79, 80 are retracted and the pedal 105 as shown in FIGS. 2 or 3 is applied in the reverse operation of the controls. A retaining device may be employed at each end of the said legs and at the said rollers as shown 106 to 109 in FIG. 3(A) to prevent them from accidentally slipping in case of necessity. Said device will allow said rollers to roll with the wheels of the motorcycle when said legs are normally lowered and extended, because the retaining member 107 of said device will be lifted up and disengaged from the arresting gear 106 of the roller by an adjustable pin 108 acting against the protrusion 109 which is formed integrally with retaining member 107. Otherwise, said retaining member 107 will engage said arresting gear 106 and hold said roller stationary when the leg on the tilted side of the motorcycle could not normally extend because of the tilting of the motorcycle, thus preventing it from accidentally slipping. Fourth, further moving forward of said control rod 20 and said control block 46, finger 58 of said control block will operate forward wheel brake lever 67 which is pivoted at the same pivot 72 as the aforementioned throttle control lever 64, thus the forward wheel brake will be applied by a linking rod 110 as shown in FIG. 3. At the same time the aft wheel brake which has been applied by the foot pedal 17 will now be locked by the locking arm 69 because of the function of finger 57 acting on locking lever 68 and onto the lever 66 which is pivoted at 111, thus holding aft wheel brake control lever 21 in locked position. Said locking arm 69 is urged to latch in a notch 112 of said locking lever 68 by a spring 113, and will be quick released by the finger 59 of the said control block 46 in the reverse operation of said control rod 20. Fifth, the final operation of said operational sequence, when said control rod 20 and said control block 46 come to the forward end of its movement, the protrusion 63 on the top of said control block 46 will press the button 70 of engine ignition switch (motorcycles only) to bring conductor 114 in contact with conductor 115 by the tension of spring 116, causing the ignition voltage at the tip of conductor 115 to be grounded thru conductor 114 and ground connection 117 as shown in FIG. 3(C), hence stopping the engine (motorcycles only). At the same time, the clamp of aft wheel lock 13 is pulled to lock the aft wheel by linkages 118 and 119 at the end of control rod 20, and the locking devices which are built in the hand grip are now in their locking position ready to be locked will be described in detail below.

Although the operational sequence as described above are classified into five steps, they will occur instantly and simultaneously in one operation of said pedal or said hand grip or both of them. The total distance for control rod 20 to travel through all five operational steps is just a very small amount of less than one inch, and lesser for said pedal and for said hand grip because of their mechanical advantages.

As mentioned above the other type of controllable legs according to this invention is type B. The legs of type B when being used to take the place of type A will be operated also by a control lever 54 as shown in FIG. 4. Two sets of extendable and retractable linkage 120 and 121 are hinge jointed with said control lever at 122 and 123 while the other end of said linkages are hinge jointed at each leg at 124 and 125 respectively. Since pivot points 126 and 127 are stationary, therefore whenever the control lever 54 moves forward it will cause the legs 11 to extend laterally downwards along their arciform tracks inside of frames 128 and 129. A retaining device in box 130 will allow said legs to extend but prevent them from retracting because of the bevelled gears of retaining blocks 131 and 132, unless said retaining blocks have been lifted up and overcome springs 133 and 134 by linkages 135 thru 139 as the control rod 20 is moved backward. Two springs 140 and 141 will help said legs to retract as soon as said control lever 54 is moved backward by the control block 46 as shown in FIG. 3 which is omitted here for simple illustration.

When control lever retaining pins 142 and 143 as shown in FIG. 2 being removed, said controllable legs of either type A or B can be further extended and secured with safety bolts 144 inseerting into the drilled holes 145 at the frame and at the legs as shown in FIGS. 2, 3 and 4, for maintenance or for towing in case of a flat tire.

The above is the construction of mechanism box 10 with all operational mechanisms therein. Said box can be mounted at proper location underneath the motorcycle or other tandem wheel vehicles and secured with mounting bolts through holes 146 and 147 as shown in FIG. 3.

The hand grip which is one of the said control means for controlling said control rod 20 comprises an operational device and two control locking devices concentrically and longitudinally arranged inside the hand grip. FIG. 5 is the overall elevation side view of the hand grip, 148 is the top portion of the plug of said grip (FIG. 5(I)) having a series of characters marked on its periphery 149 which serves as a dial for the permutation-operated device. A fixed mark 150 is placed on the side wall of the grip 14 to cooperate with the characters on the dial. A retaining cylinder 151 having a circular coupling flange 152 as shown in FIG. 5(A) is provided for coupling said grip 14 with mounting cylinder 153 (FIG.5 (B)) which is fastened to the steering column 154 of the motorcycle in the threaded connection 155 thereon and is secured with screws 156 and 157. Said retaining cylinder 151 is fastened to said mounting cylinder 153 with screws 158, 159, and can not be disconnected when they are in a locked condition which will be later described. The operational device of the hand grip consists either of a piston 164 having a single worm thread on the circumference of piston rod 166 as shown in FIG. 5(C), a control cylinder 167 having a female worm thread in the center opening 168 of its head as shown in FIG. 5(D) and a grip 14 having splines 169 on its inside wall as shown in FIG. 5(E); or consists of the said piston having double worm threads on the circumference of the piston rod (FIG.5(F) and the said grip having double female threads 170 on its inside wall (FIG. 5(AD). When assembling the former, said piston 164 and said control cylinder 167 are both installed in the mounting cylinder (153 FIG. 5(B) longitudinally, said worm thread on piston rod 166 will cooperate with the worm thread in the center opening 168 of the said control cylinder 167, a pair or screw pins 171, 172 are fastened to the piston 164 thru the openings of slots 173 on both side walls of said mounting cylinder 153, another pair of screw pins 174, 175 are fastened to the head of said control cylinder 167 thru the curved slots 176, 177 on both side walls of the said mounting cylinder 153 respectively, the splines 169 on the inside wall of said grip 14 will cooperate with splines 178 on the outside wall of the control cylinder 167 after said grip is installed and coupled together by said retaining cyliner 151. In such an arrangement, if the hand grip 14 is rotated in the direction as the arrow shown in FIG. 5 of FIG. 5(E) this will cause said control cylinder 167 to rotate and move to the right-hand side, because the screw pins 174 and 175 are sliding within the curved slots 176, 177. At the same time also causing the said piston 164 to move to the right hand side in a double speed because said screw pins 171 and 172 are sliding within the slots 173, thus, a small amount of operating of the hand grip (about one quarter of a turn) will result in approximately a one-inch travel of the piston. The result and the manner of assembly of the latter is similar to the former as described above, except there is no control cylinder in the latter device. As above noted said retaining cylinder 151 and said mounting cylinder 153 can not be disconnected when they are in a locked condition. They are locked by retaining balls a, b, c, when said balls are forced out radially from their seats 160, 161, 162 and fall into the circular retaining groove 163 (see FIG. 5(A) by said piston 164 when said piston is moved to the locked position to prevent unauthorized disassembly of the same. A thin tubular ring 165 having three holes aligned with the seats 160, 161, 162 on the mounting cylinder 153 but smaller in diameter than said balls is used to prevent said balls from accidentally dropping apart when being disassembled. The head 179 of stem 180 of the flexible shaft 16 as shown in FIG. 11 will be connected with groove 181 on the piston 164 thru opening 182 on the mounting cylinder 153 for transmitting the function of said piston to the control rod 20 in the mechanism box 10. A retaining flexible tube 183 is used for protecting said flexible shaft, one end of said tube will be fastened to the threaded opening 182 on said mounting cylinder, the other threaded end 184 of said tube can be adjusted for proper length by adjusting nuts 41 and 185 as shown in FIG. 11. Said nut 41 will be coupled with the two halves of boss 42, 43 at the end of mechanism box 10 as above noted. Referring to the above, it is obvious now that the said hand grip 14 is rotated by the function of said pedal 17 through the flexible shaft because of the construction of said operational device in the hand grip.

The said control locking devices comprises a variable permutation-operated device and a variable key-operated device within the hand grip. Said devices are spaced longitudinally and concentrically on said piston rod and they are constructed and arranged to provide means of permitting separate and independent operation of each. Therefore said piston rod 166 can be locked by one or both of the devices. To remove either or both of said locking devices will have no effect on the said operational device. FIGS. 5(G) thru 5(K) are exploded views of the mechanisms of the control locking devices. They are mounted on the piston rod in such a manner that three permutation disks 186, 188, 190 are mounted alternately between four spacing washers 187, 189, 191, 192. The permutation disks as well as said spacing washers are different in thickness, each one is two thousandth of an inch thinner than the other from left to right as shown 186 thru 191 in FIG. 5(J). The square aperture of washer 192 is fastened to square section 193 of piston rod (see FIG. 5(F)) and secured with a screw (not shown), the square aperture of the other washers 187, 189, 191 are cramped and fixed in the gaps 194 between shoulders 195. Thus these washers are stationary while the permutation disks are rotatable. So that the group of said washers and said disk assembly can move left or right together with the piston rod. A locking cylinder FIG. 5(G) having three parallel columns of locking protrusions 196 unequally parted on its inside wall encircles said permutation disks and washers assembly when assembled. Said protrusions are aligned circumferentilly with like protrusions in the other columns, the distances between the protrusions are also two thousandths of an inch, one narrower than the others from left to right in cooperation with the thickness of said washers and disks to prevent said disks from accidentally falling into the clearances between said protrusions when said disks are moved left or right together with said piston rod. Three protrusions 197 on the periphery of said washer 192 as shown in FIG. 5(J) are grasped by three longitudinal grooves 198 on the inside wall of the locking cylinder between said parallel columns of locking protrusions 196 for holding said locking cylinder stationary while the permutation disks are driven and rotated. Said protrusions 197 together with protrusions 199, 200, 201 on the periphery of said disks are also grasped by said grooves 198 to maintain the proper relationship between locking cylinder and the disks when said disks are in an unlocked position whereby the piston rod 166 is free of interference in sliding left or right. Said locking cylinder FIG. 5(G) is mounted within the cylinderical wall of the said hand grip 14, and section 202 of said locking cylinder is held in place between shoulder 203 (see FIG. 5(E)) and the bottom edge of the plug FIG. 5(I) when they are assembled. A small tooth 204 protruded from the face of a drum FIG. 5(H) will go thru opening 205 of said locking cylinder for driving teeth 206, 207, 208 on said disks when they are in the unlocking operation. Said drum having splines 209 on its periphery is mounted on inside wall of skirt 210 of the plug (see FIG. 5(I)). Any shifting of the mounting position of the drum with respect to the splined grooves 211 of the skirt will have a varied combinations of the permutation device. The variable combination numbers may be marked on the skirt for reference. Several holes 212, 213 in the wall of said skirt 210 of the plug are provided as the seats for the retaining balls 214, 215. And several holes 216, 217 in smller diameter than said balls are also provided in the wall of said drum for preventing said balls from falling inwardly. A thin ring which is not shown having the same number of holes but smaller in diameter than the balls is mounted over said skirt 210 to prevent said balls from dropping when being disassembled. A spring 218 loaded piston 219 as shown in FIG. 5(K) is mounted inside of said drum for holding said balls radially and outwardly from their seats into a circular retaining groove 220 on the inside wall of said hand grip 14 (see FIG. 5(E)) when the plug is assembled in the hand grip, so that said plug can be rotated for dialing the combinations of the permutation-operated device but can not fall out from said grip accidentally unless said piston 219 is forced back by the piston rod with washer 191 thru center opening 221 of the drum in disassembling.

The key-operated device comprises several ward plates 222, 223, a locking plate 224, and a hook 225 as shown in FIG. 5(K). They are same in thickness and can be interchanged in their mounting position in an X-shaped mounting cup 226 of the plug (see FIG. 5(I) except the locking plate and the hook which must be butted against each other in the original position for proper hooking of said locking plate. Said hook lies with its axis of translation perpendicular to that of the locking plate. Four angular protrusions of said X-shape mounting cup 226 served as a guide for the longitudinal movement of said plates, locking plate, and the hook. The face of top ward plate 222 bears against the side edge of said drum when they are assembled. A spring 227 clamped at the end of said locking plate urges center aperture 228 of the plate to lock in the notch 229 of the piston rod 166. A spring 230 clamped at the end of said hook forces the hook to grasp said locking plate in its locked or unlocked position by its teeth 231 thereon. Since those interchangeable ward plates are the same in thickness as described, and the key receiving holes 232, 233. . . in those plates are different in diameter, it is observed that interchanging the mounting position of those plates will have a result of varying the key-operated device and require different coded key contours. It is understood that more ward plates may be utilized for increasing variability, and more than one set of the locking plate and the hook as well as the notch on the piston rod may be utilized for better locking action and security of the lock. However, whenever the ward plates are interchanged for their new position to vary the use of different coded keys, the locking plate and the hook must remain in their original installation order, because the notch 229 on the piston rod 166 is fixed. Certain numbers are given to and marked on the face of those plates while zero is given to the set of locking plate and the hook. Thus the numerical code marked on the key will represent the mounting order of the said plates. Several pairs of coded-keys are given to the user and when any one of them are lost, the user can use the remaining one of the same pair to unlock the piston rod and disassemble it. The locking devices can be disassembled only when the piston rod is unlocked and the hand grip is rotated in the direction as the arrow shown in FIG. 5 or 5(E) farthermost until the washer 191 on the piston rod forces back the piston 219 to loosen the plug as previous described. Then interchange the mounting order of the above mentioned ward plates in accordance with the number of the new coded key which is going to be used and the numbers marked on the plates, reassemble the locking devices and reinstall the plug ready for use.

In the operation of the key-operated device, after the hand grip is rotated to operate all controllable mechanisms and brought the piston rod 166 to its locked position, just push in said plug to depress spring 234, (because the circular groove 220 is wider than the diameter of balls giving a sufficient room for said plug to be pushed in), the contour of the end of said piston rod 166 will act as a cam to actuate the hook 225, then said locking plate 224 will lock the piston rod at the notch 229 by the spring tension thereon, then the hook will be returned by the tension of the spring 230 thereon as described to grasp the locking plate in its locked position. Since there are gear rings 235, 236 formed integrally with both the hand grip and the plug, they will grasp each other when said plug is pushed to lock said piston rod by said key-operated device, therefore the permutation-operated device should be locked first by turning the plug in either direction to disturb the permutation disks, otherwise it can't be moved after said plug is pushed in because of said gear rings. As a result, when using the key-operated device alone, the permutation-operated device may be kept in its unlocked position if said disks had not been distrubed, but when using the permutation-operated device alone the key-operated device can not be kept in its unlocked position because the plug could be pushed in and locked accidentally. However, means is provided for improvement by relocating the notch on the piston rod rearward as the dotted lines shown in the FIG. 5(F), thru, the locking plate of the key-operated device can not be moved far enough to reach the notch with a given position of the piston rod. Thus ensure said piston rod to be locked by the permutation-operated device alone. Moving the piston rod farther to the right by rotating the hand grip, said piston rod may be now locked either by one of the locking devices or by both of the locking devices. A retaining arm 237 as shown in FIG. 5 or in FIG.3(E) is used to cooperate with the notches 238, 239 at the end of the hand grip (see FIG. 5(E)) for preventing the reverse rotation of the hand grip because the tip 240 of said retaining arm acting against said notch 238 or 239 unless it is released by depressing it. Said notches and said retaining arm are also used as an indiction for indicating how much amount of the hand grip is rotated and what kind of operation has achieved. To unlock the key-operated device just insert the proper coded key (FIG. 8) thru the key receiving guide 241 at the top face of the plug and turn it in the proper direction to unlock the piston rod.

In the operation of the permutation-operated device just turn the plug of the hand grip in the proper direction for dialing the permutation disks in accordance with the combinations being used for unlocking, or turn the plug in either direction to disturb the said disks for locking as described.

Supplementary: As referred to above, the said auxiliary throttle control lever 15 (motorcycles only) as shown in FIG. 1 is connected with control cable 242 and the throttle control lever 64 (see FIG. 3) for controlling the throttle (motorcycles only) when said legs 11 are lowered and extended in the slow movement of the vehicle. Shown in FIG. 5, 243 is the directional light switch and 244 are its leads.

Although the invention illustrated is as being used on a motorcycle or on other tandem wheel venicles, it is apparent that the invention may, with equal or in part of the facility, can be utilized on machines, equipment or in other control locking devices. Changes in the shape, size and arrangement of parts may be made to the form of invention herein shown and described, without departing from the spirit of the invention or the scope of the following claims.

I claim as my invention:

1. A safety control assembly for a tandem wheeled vehicle, said vehicle usually having an engine for driving at least one of said wheels, an ignition switch for said engine, a throttle for said engine, a warning horn, a pair of auxilary support legs movable from a retracted position to an extended position at opposite lateral sides of said vehicle, and means for braking at least one of said wheels, said control assembly comprising: a mechanism box mounted underneath said vehicle, a hand operational means mounted on said vehicle, a foot operational means mounted on said vehicle, said mechanism box embodying a series of operational mechanisms, each of said operational means being movable through a plurality of sequential positions, means for actuating said operational means through said sequential positions for sequentially moving said throttle in a speed decreasing direction, actuating said horn, moving said auxilary support legs to said extended position, and actuating said braking means, respectively, and means for locking said control assembly in the respective position in which said ignition switch is off and said operational means are locked, said responsive movements are reversible after said locking means are unlocked, said assembly also being adapted for use on a non-motorized tandem wheel vehicle with the throttle control and ignition switch omitted or disconnected.

2. A safety control assembly according to claim 1, wherein said actuating means comprises of several control members mounted on a longitudinal rod within said mechanism box, means for connecting said rod to either or both of said operational means, said operational mechanisms being mounted at a proper location in said box and being movable by said control members responsive to movement of either or both of said operational means through said sequential positions.

3. A safety control assembly according to claim 2, wherein said mechanism box has a bottom cover with one end hinge jointed and the other end of screw fastened to the box, some of said operational mechanisms being mounted stationary at the upper section inside said box while the rest of said mechanisms being pivotally mounted on the bottom cover, said control members having longitudinal mobility with said rod are mounted between said upper and lower mechanisms in the box, thus said mechanisms can be operated normally only when said bottom cover is properly closed and secured to said box, a retaining means being provided thereon said box for locking the bottom cover with the box whenever said rod is being moved to its locked position to prevent the cover from being opened by unauthorized persons or accidently.

4. A safety control assembly according to claim 3, wherein said control members comprise of a control block, said block having several potrusions or fingers formed integrally at the sides and top of said block for operating said mechanisms, said block also serving as a quick disconnect for coupling said rod to said hand operational means through a flexible shaft, said shaft being covered by an adjustable flexible tube for adjustment of proper length when assembled.

5. A safety control assembly according to claim 1, wherein said hand operational means comprising of a rotatable hand grip mounted on the steering column of the vehicle in place of a conventional hand grip, a movable rod longitudinally mounted at the center of said grip, means for connecting said movable rod to the rod in the mechanism box through said flexible shaft, an operational device for moving said movable rod back or forth responsive to rotation of said hand grip in one direction or in the other direction through a plurality of sequential positions for sequentially operating said mechanisms, two locking devices being mounted concentrically and longitudinally on said movable rod, said locking devices being independent to each other, said movable rod when moving to extreme end in a speed decreasing direction can be locked by either one or both of said locking devices, either one or both of said locking devices can be removed without having any effect on said operational device of the hand grip.

6. A safety control assembly according to claim 1, wherein said foot operational means comprising of an aft wheel brake operating means, a cooperating means for operating said actuating means in the mechanism box, said aft wheel brake operating means being operatable independently or simultaneously with said cooperating means by a foot pedal thereby, means also provided therein for automatic locking or quick release the aft wheel brake operating means, said foot operational means can move said actuating means independently or simultaneously with said hand operational means, however, said hand operational means moving said actuating means having no effect to the foot operational means, but on the contrarily, moving said foot operational means resulting in a rotating of said hand grip at the same time because of said cooperating means and said operational device therein.

7. A safety control assembly according to claim 1, wherein said auxilary support legs can be of at least two different types, a pair of auxilary support legs of said either types movable from a retracted position to an extended position a the opposite lateral sides of said vehicle, a controllable means for controlling said legs of either types, said legs at either sides of the vehicle being movable independently by said controllable means because of its pivotal mobility relative to the longitudinal rod allowing said legs of either types to extend differently in length when the ground surface is rough or inclined, thus, said legs will touch the ground concurrently with the wheels of the vehicle, rendering a four-point stationary support, an automatic grasping means being provided thereby for preventing said legs from accidentally retracting whenever said legs are touching the ground, said automatic grasping means will automatically release allowing said legs to retract in a reverse operation of said controllable means, means are also provided at each leg for automatic fastening to a ring or bolt which is fixed on the ground for preventing unauthorized moving of the vehicle, said legs can be further extended and secured by a safety bolt inserted in a hole in the legs and at the frame for maintenance or for towing purposes in case of flat tire.

8. A safety control assembly according to claim 7, wherein one type of said support legs comprising of an U-shaped frame having its milled cross-shaft laterally mounted on the mechanism box, a pair of support legs having a roller at each end of the legs being slidably mounted on each post of said frame capable to swinging up or down together with said frame about said cross-shaft, said legs being slidable to extend or retract along said post of the frame by means of said controllable means, a semiautomatic retaining means for retaining said legs and said frame in the up position when the legs are not in use, or in the down position when the legs are in use, an automatic retaining means being provided thereby for temporarily holding said controllable means stationary while said legs together with said frame are lowering or swinging downward, thus preventing said legs from extending before said legs and said frame reaching to their vertical position, allowing said legs to extend vertically and free from any possible ground obstruction, furthermore, an automatic arresting means being equipped at each leg for preventing said roller from accidentally slipping as required, said arresting means will keep said roller stationary when the leg on the tilted side of the vehicle which can not normally extended because of over tilting limit of the vehicle, thus preventing it from accidentally slipping.

9. A safety control assembly according to claim 7, wherein the other type of said controllable legs comprises two arciform legs having a roller mounted at each end of the legs, each of said legs being mounted axially in an arciform frame at each side lateral of said mechanism box, said controllable means extends or retracts said legs laterally downward or upward responsive to the movement to the movement of said either or both of said operational means, said automatic grasping means thereby allowing said legs to extend but preventing them from retracting unless said retaining device being released by said controllable means in the reverse operation of said operational means.

* * * * *